United States Patent [19]

Min et al.

[11] Patent Number: 4,902,214

[45] Date of Patent: Feb. 20, 1990

[54] AUTOMATIC MULTICOLOR RUBBER MOLDING MACHINE

[76] Inventors: Chang Y. Min, 7th Fl. No. 5 Alley 40, Lane 190 Te Hsin E. Rd.; Yi-Shen Chang, 3rd Fl. No. 3 Alley 1, Lane 1544, Min Chuan E. Rd., both of Taipei, Taiwan

[21] Appl. No.: 314,660

[22] Filed: Feb. 23, 1989

[51] Int. Cl.$^4$ .............................................. B29C 33/34
[52] U.S. Cl. .................................... 425/195; 425/347
[58] Field of Search ............... 425/134, 157, 159, 160, 425/195, 257, 347, 359, 361, 384, 407, 447, 453, 457

[56] References Cited

U.S. PATENT DOCUMENTS

| | | | |
|---|---|---|---|
| 733,338 | 7/1903 | Smith | 425/347 |
| 1,362,928 | 12/1920 | DeBay | 425/359 |
| 3,555,597 | 1/1971 | Meadows | 425/407 X |
| 3,981,671 | 9/1976 | Edwards | 425/195 X |
| 4,050,864 | 9/1977 | Komaki | 425/134 |
| 4,153,401 | 5/1979 | Longinotti | 425/134 |
| 4,698,001 | 10/1987 | Vismara | 425/134 X |

FOREIGN PATENT DOCUMENTS 609839 2/1935 Fed. Rep. of Germany ...... 425/134
1256965 9/1986 U.S.S.R. .............................. 425/134

Primary Examiner—Richard L. Chiesa
Attorney, Agent, or Firm—Lilling & Greenspan

[57] ABSTRACT

A new automatic multicolor rubber molding machine includes a feed unit having a plurality of tanks for rubber material of different colors. A heating and pressing unit have upper and lower electric heaters, and a mold unit consisting of one or more distributing boards is mounted on the bottom of the rubber tanks and has a plurality of gates, paths and ports. A female mold is capable of traveling into the feed unit and the heating and pressing unit, and a male mold is attached to the mold opener or mounted under the upper heater in the heating and pressing unit, and is constructed in such way that the female mold can enter the feed unit for the rubber material of different colors to flow from the tanks through the gates, paths and ports of the distributing board into the cavities of the female mold, retreat for the mold opener to put on the male mold, enter again the heating and pressing unit for heating and vulcanizing and retreat again for the mold opener to open the molds for removing the final products so that the multicolor products are made in an integrated operation.

2 Claims, 4 Drawing Sheets

AUTOMATIC MULTICOLOR RUBBER MOLDING MACHINE

BACKGROUND OF THE INVENTION

1. Field of the Invention

This invention relates to a new multicolor rubber molding machine which can make rubber products of different colors at a time.

2. Description of the Prior Art

Conventional rubber molding machines now available can not feed automatically, especially when multicolor products such as rubber keys of computer keyboard are made at a time. In using such machines, workers have to prepare pieces of rubber in approximate size and shape of the finished product and put the pieces in molds shaped to form the final product. So the conventional rubber molding machine has the following disadvantages: (1) The rubber must be punched or cut into pieces before being put in the molds to form the final product. This takes time, effort and money. (2) The pieces cut and punched must be in approximate size and shape of the finished product and uneven density is to be resulted. (The mass in the center will have a greater density than that in the remote part.) (3) The operation of material feeding, mold taking and mold closing is carried out manually. It takes time and increases the cost.

SUMMARY OF THE INVENTION

In view of the above mentioned disadvantages, those skilled in the art of rubber molding, including the inventor, have tried hard to make improvements to overcome those disadvantages. So the main object of this invention is to provide a new rubber molding machine which can automatically form rubber products of different colors at a time.

The new automatic multicolor rubber molding machine is characterized by composing a heating and pressing unit, a feed unit and a mold opener. The feed unit has a plurality of automatic feed tanks under which a distributing board of the female mold is mounted with the outlets of the tanks in alignment with the gates of the distributing board so that the rubber material of different colors can be fed automatically to different cavities of the female mold. Under automatic control, the female mold can automatically enter the feed unit and the heating and pressing unit. After the female mold retreats from the feed unit, the mold opener can automatically put on the male mold. Then the female mold with the male mold enters the heating and pressing unit for the rubber material of different colors in the molds to be heated by the upper and lower heaters and vulcanized at the same time. When the preset time for vulcanization is over, the molds retreat for removing the final products after being opened by the mold opener. Thus, the rubber products of different colors are formed in an integrated operation.

Another feature of this invention is that the female mold has one or more distributing boards which overlap each other and are mounted under the tanks of the feed unit. The distributing board has a plurality of gates, paths and ports. The gates are in alignment with the outlets of the tanks while the ports are in alignment with the cavities of the female mold. Thus, the rubber material in different colors can flow freely from different tanks through different gates, paths and ports of the distributing board to different cavities of the female mold for forming rubber keys of different colors.

BRIEF DESCRIPTIONS OF THE DRAWINGS

DETAILED DESCRIPTION OF THE PREFERRED EMBODIMENT

Figure 1:
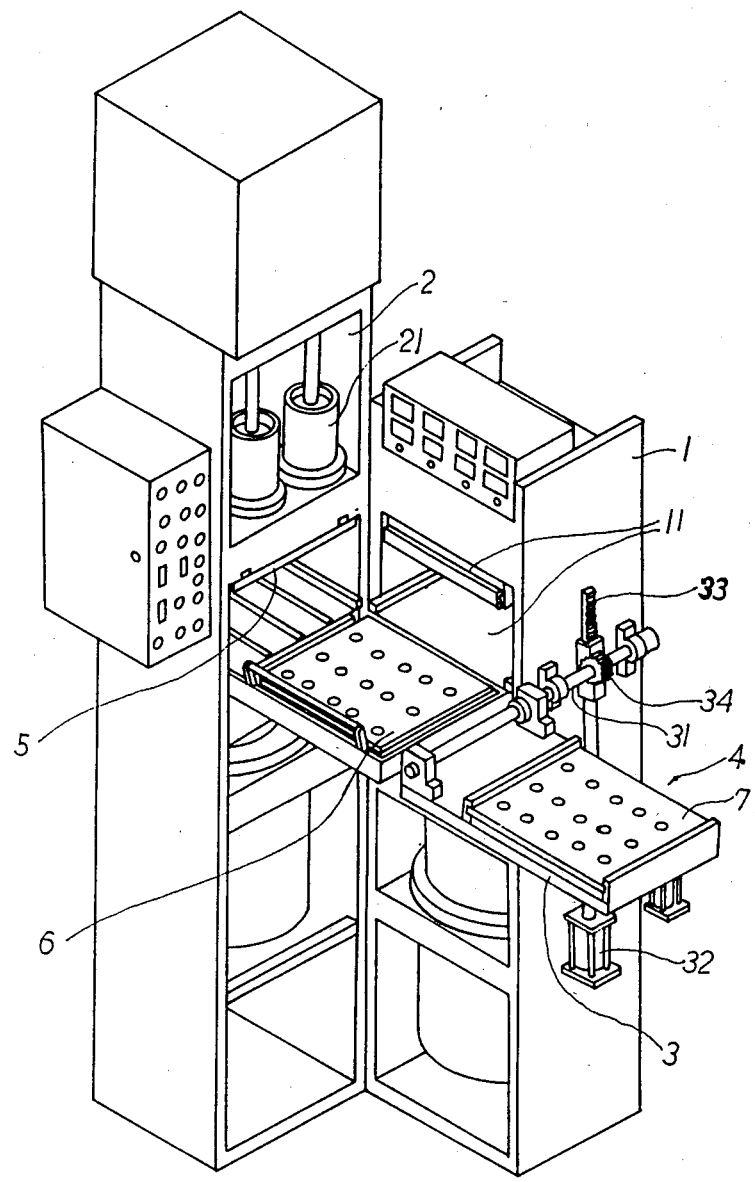
FIG. 1 is a vertical view of the new automatic multicolor rubber molding machine of this invention.

As shown in FIG. 1, the new automatic multicolor rubber molding machine comprises a heating and pressing unit 1, feed unit 2, mold opener 3 and mold unit 4.

The heating and pressing unit 1 consists mainly of upper and lower heaters 11. The feed unit 2 consists of a plurality of feed tanks 21 (4 in the preferred embodiment).

Figure 2:
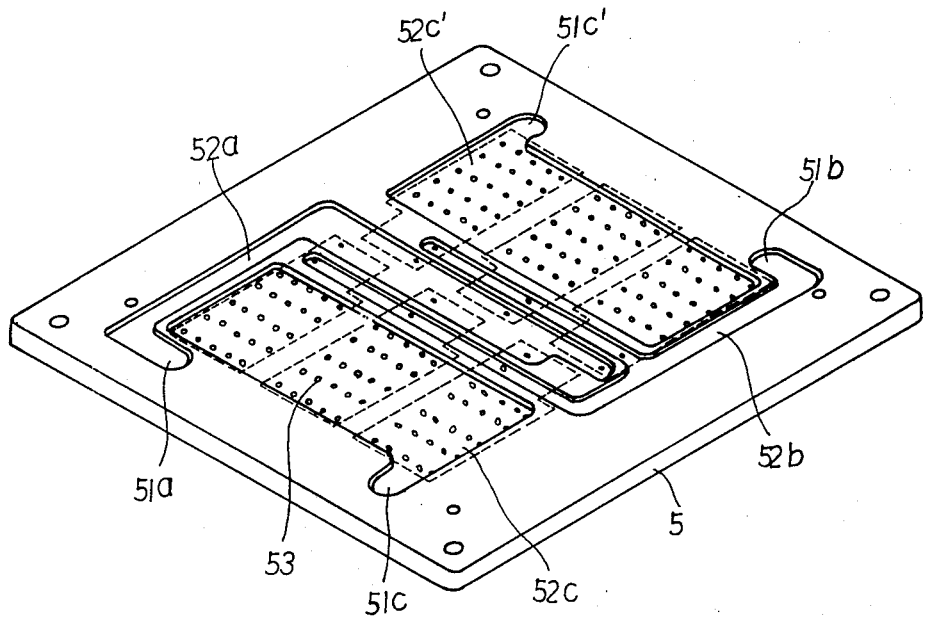
FIG. 2 illustrates the female mold and distributing board of the said mold machine.
Figure 2:
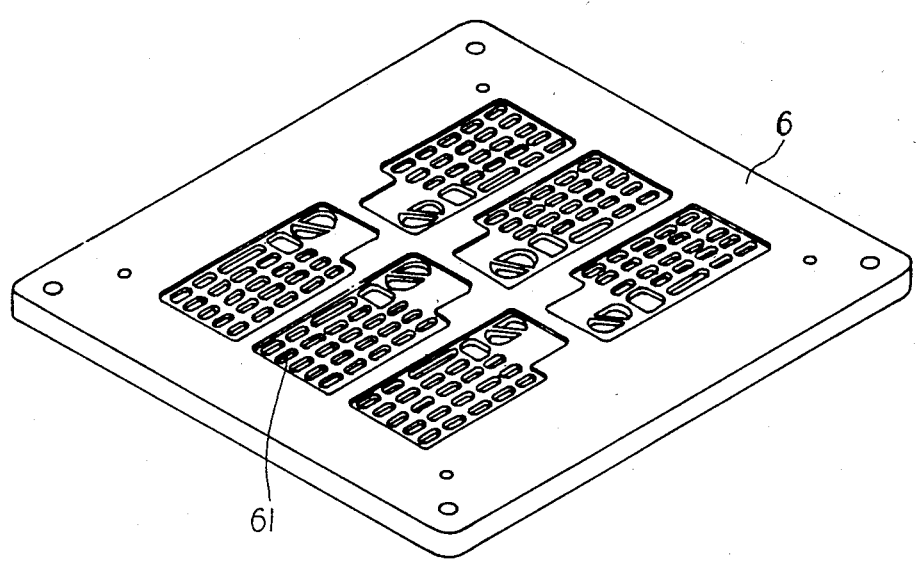
Figure 3:
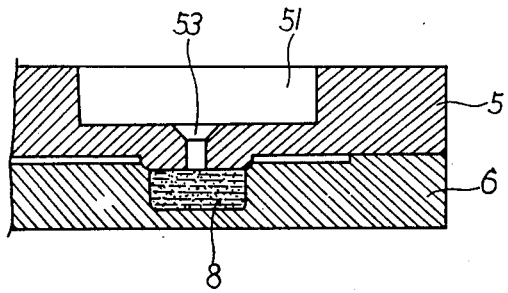
FIG. 3 illustrates the joint of the female mold and distributing board for the rubber material to flow.
Figure 4:
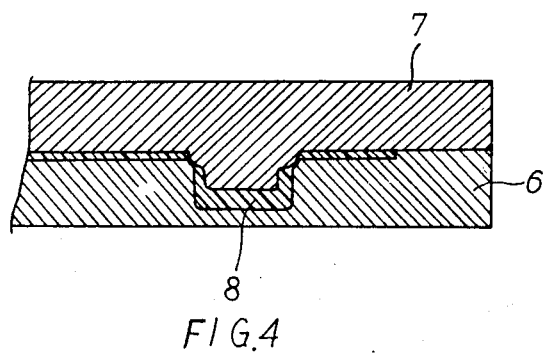
FIG. 4 illustrates the matching of the female and male molds.
Figure 5:
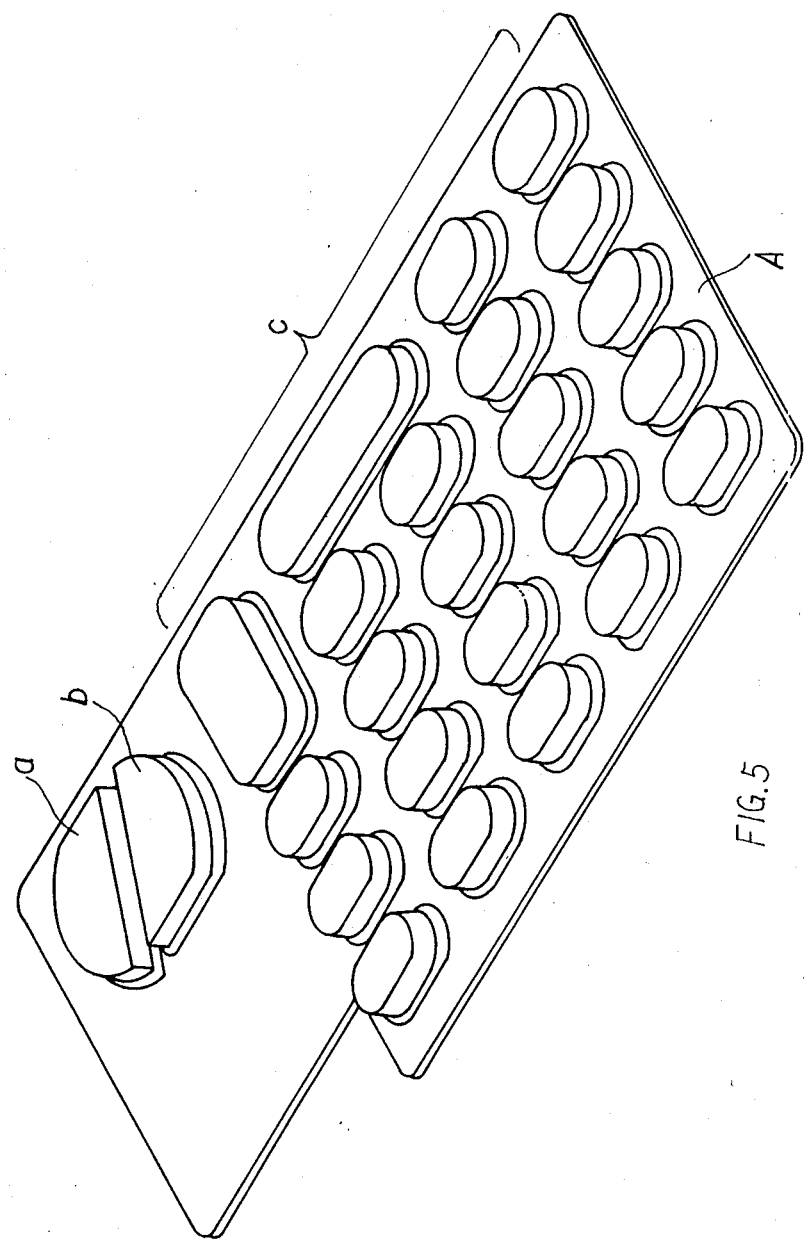
FIG. 5 illustrates the rubber keyboard products formed in the mold as shown in FIG. 3.

The mold unit 4 consists of one or more distributing boards 5 (depending on the actual need), female mold 6 and male mold 7. As shown in FIG. 2, the distributing board 5 mounted on the bottom of the feed tanks 21 has gates 51a, 51b, 51c, 51c' corresponding to the outlets of the feed tanks 21, feed paths 52a, 52b, 52c, 52c' and distributing ports 53 so that the rubber material from the feed tanks can be fed through the gates 51a, 51b, 51c, 51c', feed paths 52a, 52b, 52c, 52c' and distributing ports 53 to the cavities 61 of the female mold 6. The molds in the preferred embodiment are designed for shaping rubber keys of six computer keyboards. As shown in FIG. 5, the keys "a" are in one color, the keys "b" are in another color, the keys "c" are in still another color. It is so designed that the path 52a leads to the cavities 61 of keys "a," and the path "b" to the cavities 61 of keys "b", the paths 52c, 52c' to the cavities 61 of keys "c".

The female mold 6 can travel in the feed unit 2 and the heating and pressing unit 1. The male mold 7 is attached to the mold opener 3. The mold opener 3 mounted on the side of the heating and pressing unit 1 consists of a shaft 31, a rack 33, a pinion 34 and two hydraulic cylinders 32 and is so constructed that the shaft 31 can be turned hydraulically to open or close the mold.

In operation, the male mold 7 is opened (180°) and the female mold 6 enters automatically the feed unit 2 and goes up to join the distributing board 5. The rubber material 8 of different colors flows from the feed tanks 21 of the feed unit 2 through the gates 51a, 51b, 51c, 51c', feed paths 52a, 52b, 52c, 52c' and distributing ports 53 in the distributing board 5 into the cavities 61 of the female mold 6. At this time conductors or black particles, if necessary, can be put in the male mold 7 corresponding to the cavities of the female mold 6. After being filled, the female mold 6 lowers and retreats from the feed unit 2. At this time, the mold opener 3 closes the mold automatically. Then the female and male molds are carried into the heating and pressing unit 1 and lifted for the rubber material 8 to be heated by upper and lower electric heaters and vulcanized at the same time. When the preset time for vulcanization is over, the female and male molds retreat automatically from the heating and pressing unit and opened automatically by the mold opener. The rubber keys molded by heating under pressure are then removed from the molds.

In case no conductors are put in the molds, the male mold may be mounted in the heating and pressing unit under the upper electric heater.

The whole operation is carried out automatically under automatic control.

From above it is seen that the automatic multicolor rubber molding machine can simultaneously feed fixed amount of rubber material of different colors to specific cavities of the female mold and shape the rubber into final products in an integrated operation.

This invention is not limited to the precise constructional details shown in the drawings and described herein and modifications and changes may be made without departing from the spirit or scope of the invention.

What is claimed is:

1. An automatic multicolor rubber molding machine comprising:
  a feed unit consisting of a plurality of tanks for rubber materials of different colors;
  a heating and pressing unit having upper and lower electric heaters;
  a mold opener;
  a mold unit consisting of at least one distributing board;
  a female mold and a male mold, said distributing boards being mounted on the bottom of the rubber material tanks and having a plurality of gates, paths and ports, said female mold being capable of traveling into the feed unit and heating and pressing unit, said male mold being attached to the mold opener when not in use and positioned so that the female mold can enter the feed unit for the rubber materials of different colors to flow from the tanks through the gates, paths and ports of the distributing board into the cavities of the female mold, retreat for the mold opener to put on the male mold, enter again the heating and pressing unit for heating and vulcanizing, and retreat again for removing the final products from the molds after being opened by the mold opener, so that the multicolor rubber products are made in an integrated operation.

2. A new automatic multicolor rubber molding machine according to claim 1 wherein the male mold is mounted in the heating and pressing unit under the upper electric heater.

* * * * *